United States Patent
Smith et al.

(10) Patent No.: US 8,579,063 B2
(45) Date of Patent: Nov. 12, 2013

(54) MOTORCYCLE HAVING DETACHABLE SUPPORT MEMBERS

(75) Inventors: Brendon Smith, Milwaukee, WI (US); Andrew Holtan, Milwaukee, WI (US); Christopher J. Butkiewicz, Brookfield, WI (US); Francis Giunta, Hartford, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 1631 days.

(21) Appl. No.: 11/771,376

(22) Filed: Jun. 29, 2007

(65) Prior Publication Data
US 2009/0000845 A1    Jan. 1, 2009

(51) Int. Cl.
 *B62K 19/30*    (2006.01)
(52) U.S. Cl.
 USPC ........ 180/219; 280/152.1; 280/852; 280/854; 293/105
(58) Field of Classification Search
 USPC .......... 180/219, 152.2, 159, 160, 854, 852, 180/304.3; 224/413, 423, 430; 293/105; 296/78.1; 280/152.2, 152.1, 159, 160, 280/160.1, 854, 852, 304.3
 See application file for complete search history.

(56) References Cited

U.S. PATENT DOCUMENTS

| | | | |
|---|---|---|---|
| 1,565,624 A | 12/1925 | Chilton | |
| 3,872,944 A | 3/1975 | Shapiro et al. | |
| 3,945,463 A | 3/1976 | Okano et al. | |
| 4,139,072 A | 2/1979 | Dawson | |
| 4,461,366 A | 7/1984 | Honda | |
| 4,485,884 A | 12/1984 | Fukunaga et al. | |
| 4,500,101 A | 2/1985 | Aoki | |
| 4,556,119 A | 12/1985 | Shiratsuchi | |
| 4,660,854 A | 4/1987 | Suzuki et al. | |
| 4,805,716 A | 2/1989 | Tsunoda et al. | |
| 5,025,883 A | 6/1991 | Morinaka et al. | |
| 5,248,012 A | 9/1993 | Kurawaki et al. | |
| 5,284,221 A | 2/1994 | Warne | |
| 5,299,832 A * | 4/1994 | Price, Sr. | 280/854 |
| 5,377,776 A | 1/1995 | Saiki | |
| 5,487,443 A | 1/1996 | Thurm | |
| 5,704,442 A | 1/1998 | Okazaki et al. | |
| D394,234 S | 5/1998 | Gogan et al. | |
| 5,845,728 A | 12/1998 | Itoh et al. | |
| 5,921,339 A | 7/1999 | Matsuura | |

(Continued)

FOREIGN PATENT DOCUMENTS

| | | | |
|---|---|---|---|
| JP | 02002362457 | * | 12/2002 |
| WO | 2007052298 | | 5/2007 |

*Primary Examiner* — Anne Marie M Boehler
(74) *Attorney, Agent, or Firm* — Michael Best & Friedrich LLP

(57) ABSTRACT

A motorcycle includes a steering head, a steering assembly pivotably coupled to the steering head, at least one longitudinal frame member extending rearwardly from the steering head, and a rear frame member coupled to the longitudinal frame member. The rear frame member includes a mounting portion having a mounting surface, and first and second walls extending from the mounting surface at an oblique angle to the mounting surface. The motorcycle also includes a support coupled to the rear frame member. The support includes a coupling portion having a coupling surface, and first and second walls extending from the coupling surface at an oblique angle to the coupling surface. The first and second walls of the mounting portion are wedged against the first and second walls of the coupling portion, respectively, to substantially prevent rotation of the support with respect to the rear frame member.

22 Claims, 8 Drawing Sheets

(56) References Cited

U.S. PATENT DOCUMENTS

| | | |
|---|---|---|
| 5,931,360 A | 8/1999 | Reichert |
| 5,984,336 A | 11/1999 | Hanafusa et al. |
| 6,003,628 A | 12/1999 | Jurrens et al. |
| 6,073,948 A | 6/2000 | Motojima et al. |
| 6,257,362 B1 | 7/2001 | Scherbarth |
| 6,290,015 B1 | 9/2001 | Horii et al. |
| 6,290,017 B1 | 9/2001 | Ito |
| 6,446,996 B1 | 9/2002 | Horii |
| 6,575,259 B2 | 6/2003 | Buell et al. |
| 6,846,018 B2 | 1/2005 | Dennert et al. |
| 2003/0010555 A1* | 1/2003 | Galbraith et al. ............ 180/219 |
| 2003/0164257 A1 | 9/2003 | Soileau |
| 2004/0035623 A1 | 2/2004 | Fecteau et al. |
| 2006/0060407 A1 | 3/2006 | Siddle |
| 2008/0169323 A1* | 7/2008 | Deitrich ....................... 224/413 |

\* cited by examiner

MOTORCYCLE HAVING DETACHABLE SUPPORT MEMBERS

FIELD OF THE INVENTION

The present invention relates to motorcycles, and more particularly to motorcycle frames and accessory supports.

BACKGROUND OF THE INVENTION

Motorcycle frames commonly include two fender supports for mounting therebetween a rear fender covering the rear wheel of the motorcycle. Such fender supports are typically welded to the motorcycle frame or are integral with the frame to support the weight of the fender, and other accessories supported by the fender (e.g., saddle bags), on the frame. Consequently, motorcycle frames are commonly specifically configured by a manufacturer for use with a predetermined tire size and fender size.

SUMMARY OF THE INVENTION

The present invention provides, in one aspect, a motorcycle including a steering head, a steering assembly pivotably coupled to the steering head, at least one longitudinal frame member extending rearwardly from the steering head, and a rear frame member coupled to the longitudinal frame member. The rear frame member includes a mounting portion having a mounting surface, and first and second walls extending from the mounting surface at an oblique angle to the mounting surface. The motorcycle also includes a support coupled to the rear frame member. The support includes a coupling portion having a coupling surface, and first and second walls extending from the coupling surface at an oblique angle to the coupling surface. The first and second walls of the mounting portion are wedged against the first and second walls of the coupling portion, respectively, to substantially prevent rotation of the support with respect to the rear frame member.

The present invention provides, in another aspect, a support member for a motorcycle having a rear frame member. The support member includes a coupling portion having a coupling surface, and first and second walls extending from the coupling surface at an oblique angle to the coupling surface. The first and second walls are configured to wedge against a portion of the rear frame member. The support portion also includes an aperture that extends through the coupling surface. The support member also includes a support portion extending from the coupling portion.

The present invention provides, in yet another aspect, a method of assembling a motorcycle. The method includes providing a frame having a rear frame member, providing a support member including a coupling portion having a coupling surface, and first and second walls extending from the coupling surface at an oblique angle to the coupling surface, wedging the first and second walls of the coupling portion against a portion of the rear frame member, and fastening the support member to the rear frame member.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
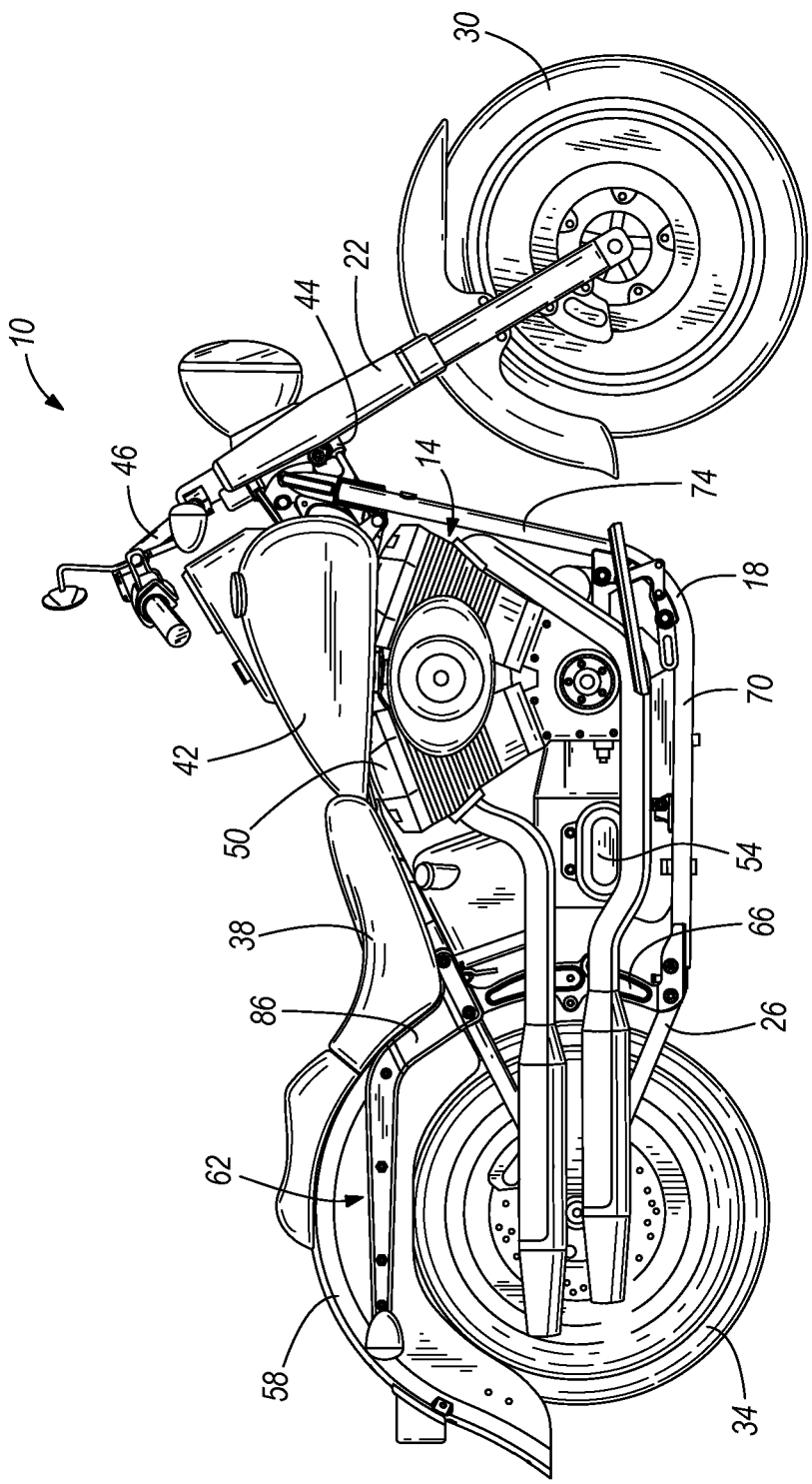
FIG. 1 is a side view of a motorcycle embodying the present invention incorporating detachable support members configured as fender struts.

FIG. 1 illustrates a motorcycle 10 including a drive assembly 14, a frame 18, a front fork assembly 22, a swing arm or rear fork assembly 26, a front wheel 30, a rear wheel 34, a seat 38, and a fuel tank 42. The frame 18 supports the drive assembly 14, the front fork assembly 22, the rear fork assembly 26, the seat 38, and the fuel tank 42. The frame 18 includes a steering head 44 that pivotally supports the front fork assembly 22, which, in turn, supports the front wheel 30. The front fork assembly 22 includes a pair of handlebars 46 for steering the motorcycle 10. The rear fork assembly 26 is coupled to the frame 18 at a rear end of the motorcycle 10 and rotatably supports the rear wheel 34. The seat 38 is coupled to the frame 18 and is configured for supporting a rider. The fuel tank 42 is supported by the frame 18 and provides fuel to the drive assembly 14.

The drive assembly 14 is coupled to the frame 18 beneath the seat 38 between the front wheel 30 and the rear wheel 34 of the motorcycle 10. With continued reference to FIG. 1, the drive assembly 14 includes an engine 50 and a transmission 54, which comprise distinct, independent components of the drive assembly 14. The engine 50 comprises a V-twin engine 50 supported by the frame 18 forward of the transmission 54. The engine 50 includes an output shaft (not shown), such as a crankshaft, which includes a primary drive sprocket (not shown) for driving a primary chain (not shown) in a conventional manner to power the transmission 54.

With continued reference to FIG. 1, the motorcycle 10 includes a rear fender 58 that at least partially covers the rear wheel 34. The rear fender 58 is coupled to the frame 18 on either side of the fender 58 by a support member configured as a fender strut 62 (see FIG. 2). Specifically, the fender struts 62 are coupled to rear frame members 66 of the frame 18. In the illustrated construction of the frame 18, the rear frame members 66 are coupled to the steering head 44 by a pair of substantially longitudinal frame members 70 configured to support the drive assembly 14, and a pair of down-tubes 74 extending between the steering head 44 and the longitudinal frame members 70 (see FIG. 1), and a frame backbone 76. Alternatively, the frame 18 may have any of a number of different configurations incorporating the rear frame members 66 and steering head 44.

Figure 2:
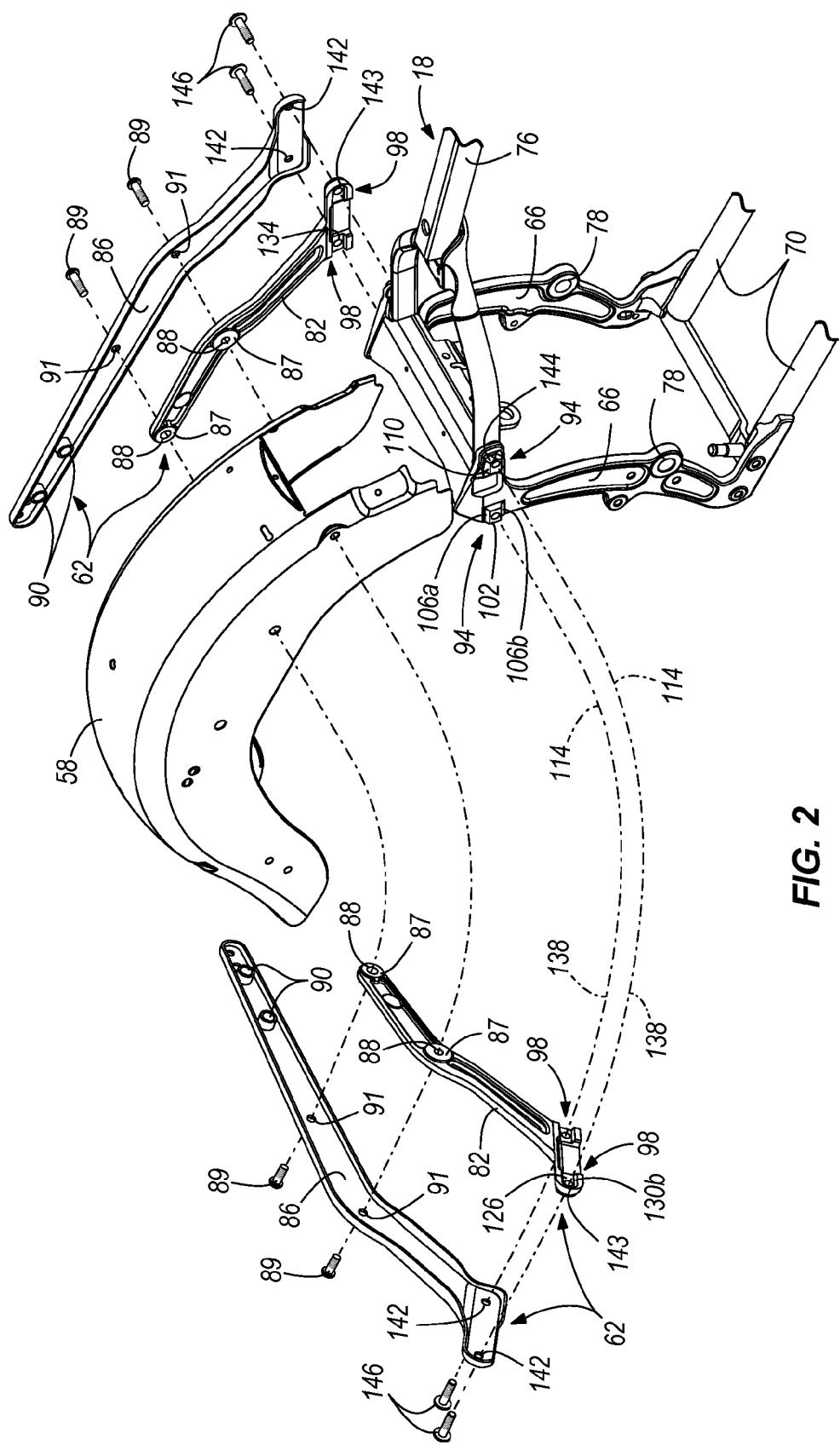
FIG. 2 is an exploded, perspective view of a portion of the motorcycle of FIG. 1, illustrating a frame, a rear fender, and the fender struts coupling the rear fender to the frame.
Figure 4:
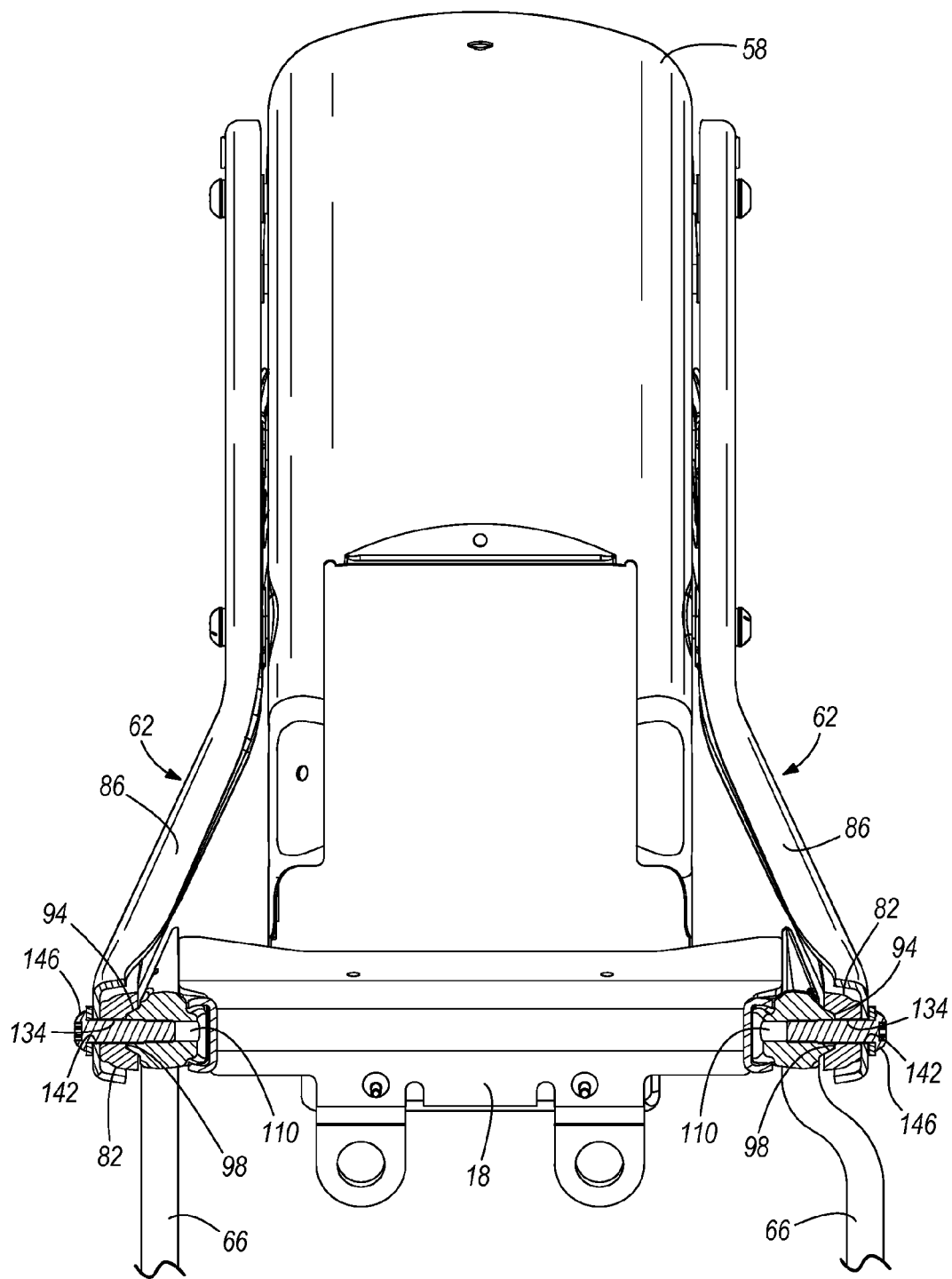
FIG. 4 is a cross-sectional view through the frame and the fender struts taken along line 4-4 in FIG. 3.

With reference to FIG. 2, the rear frame members 66 are forgings that are welded to the longitudinal frame members 70 and other portions of the frame (e.g., the frame tubing shown in FIGS. 2 and 4). The rear frame members 66 also each include a pivot 78 configured to receive an axle for pivotably mounting the swing arm or rear fork assembly 26 (see FIG. 1). Alternatively, the rear frame members 66 may be made from any appropriate process such as a casting process, or the rear frame members 66 may comprise a rear portion of the frame 18 that does not support the swing arm or rear fork assembly 26.

With reference to FIG. 2, the illustrated fender struts 62 each include a fender support 82 and a fender support cover 86 at least partially overlying the fender support 82. In the illustrated construction, the fender supports 82 are forgings configured to support substantially the entire weight of the rear fender 58 and any accessories attached to the fender 58 (e.g., saddle bags, sissy bars, back rests, passenger seats, etc.), while the fender support covers 86 are configured as decorative members that support little to none of the weight of the fender 58 and any attached accessories.

With continued reference to FIG. 2, each of the fender supports 82 includes dual mounting bosses 87 that engage a side of the rear fender 58. Each of the fender supports 82 includes an aperture 88 through each of the mounting bosses 87 to receive a fastener 89. Corresponding apertures 91, aligned with the apertures 88 in the fender supports 82, are formed in each of the fender support covers 86 to also receive the fasteners 89. In the illustrated construction of the fender struts 62, the fender support covers 86 are longer than the fender supports 82 and include a plurality of apertures 90 through which additional fasteners (not shown) may be inserted to fasten the rear of the fender 58 directly to the fender support covers 86 to stiffen and decrease vibration of the rear fender 58 during operation of the motorcycle 10.

In the illustrated construction of the motorcycle 10, the rear frame members 66 each include dual mounting portions 94, configured as projections, and the fender supports 82 each include dual coupling portions 98, configured as recesses, that receive and engage the dual mounting portions 94 on the respective rear frame members 66. Alternatively, the rear frame members 66 may be configured to include the dual coupling portions 98, and the fender supports 82 may be configured to include the dual mounting portions 94. Also, the rear frame members 66 may alternatively include only a single mounting portion 94 or more than two mounting portions 94. Likewise, the fender supports 82 may alternatively include only a single coupling portion 98 or more than two coupling portions 98.

Figure 3:
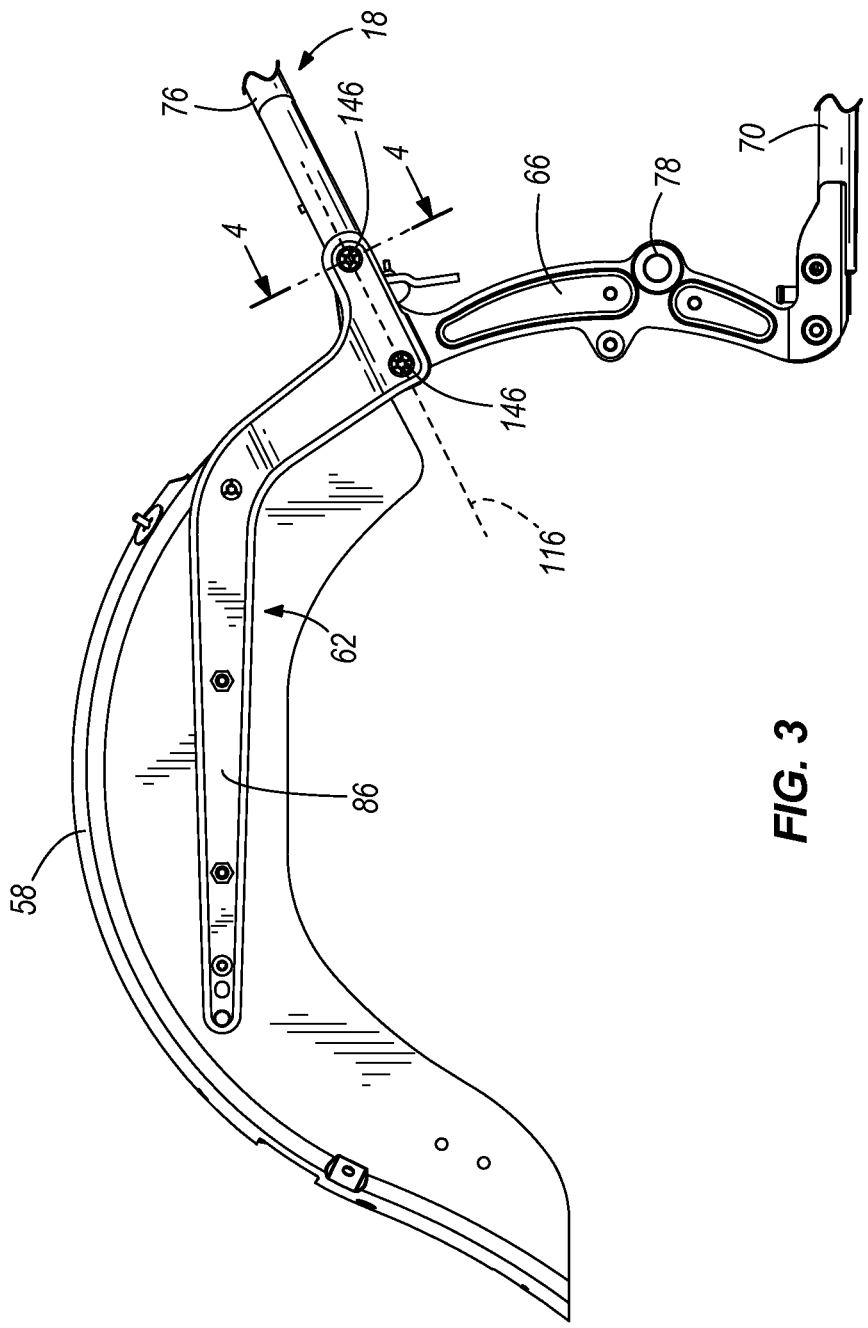
FIG. 3 is an assembled side view of the portion of the motorcycle shown in FIG. 2.
Figure 4A:
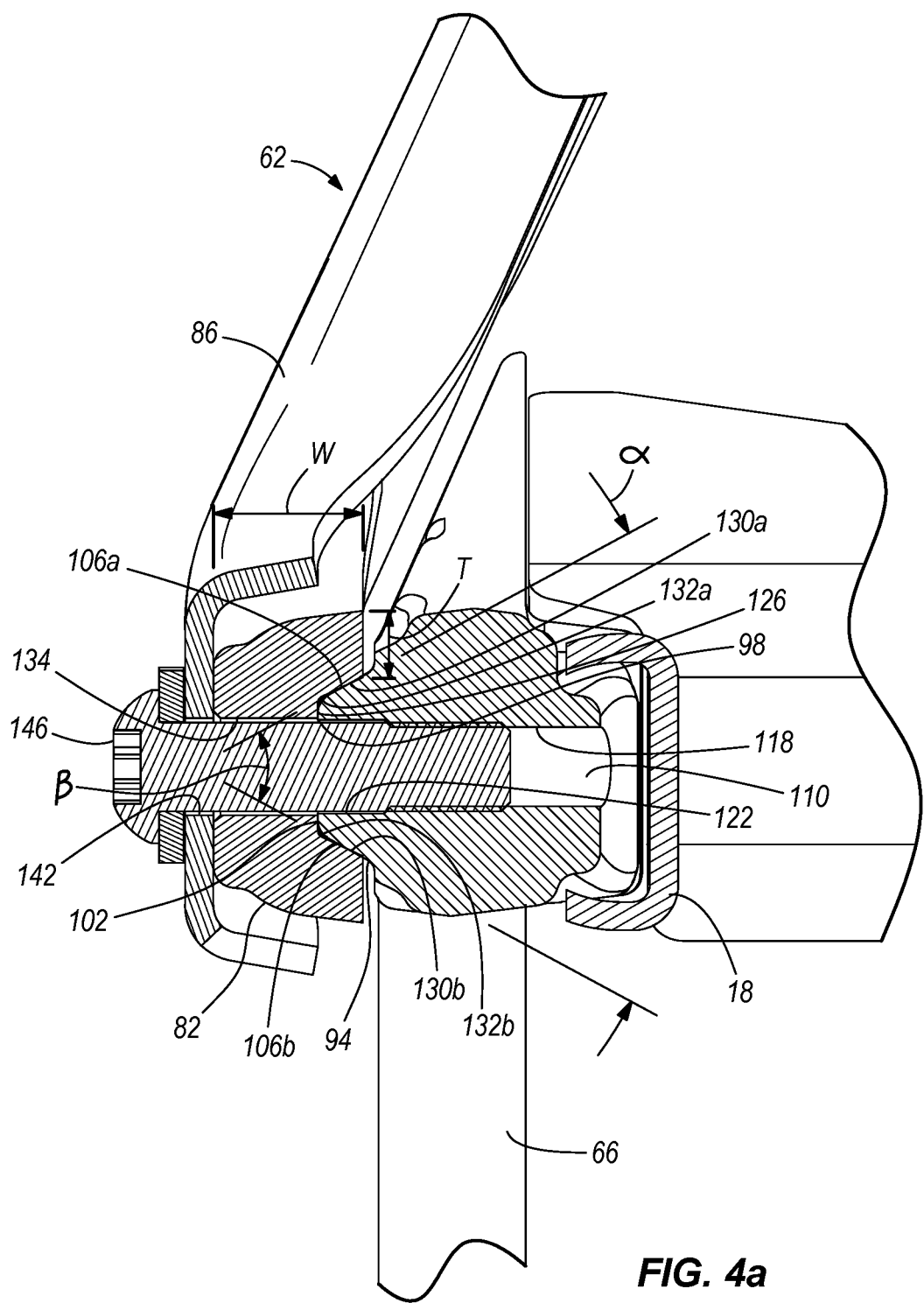
FIG. 4a is an enlarged view of a portion of the frame and one of the fender struts shown in FIG. 4.

With reference to FIGS. 2 and 4a, each mounting portion 94 includes a substantially planar mounting face or surface 102, a wall 106a extending from the top of the mounting surface 102 at an oblique angle with respect to the mounting surface 102, and a wall 106b extending from the bottom of the mounting surface 102 at an oblique angle with respect to the mounting surface 102. Also, each mounting portion 94 includes a mounting aperture 110, defining a central axis 114, extending through the rear frame member 66. Each aperture 110 includes a threaded bore 118 spaced axially inwardly from the mounting surface 102 and a counter-bore 122 extending between the threaded bore 118 and the mounting surface 102. As shown in FIGS. 2 and 3, the axes 114 of the mounting apertures 110 lie in a common plane 116. As a result, the dual mounting portions 94 on each rear frame member 66 are aligned with each other and are symmetrical about the plane 116.

With continued reference to FIGS. 2 and 4a, each coupling portion 98 includes a substantially planar coupling face or surface 126, a wall 130a extending from the top of the coupling surface 126 at an oblique angle with respect to the coupling surface 126, and a wall 130b extending from the bottom of the coupling surface 126 at an oblique angle with respect to the coupling surface 126. In the illustrated construction of the coupling portions 98, the coupling surface 126 and the wall 130a share a common top edge 132a, and the coupling surface 126 and the wall 130b share a common bottom edge 132b. Alternatively, the coupling portions 98 may be configured to include blended surfaces between the coupling surface 126 and the wall 130a and the coupling surface 126 and the wall 130b, respectively. Each coupling portion 98 also includes a coupling aperture 134, defining a central axis 138 substantially coaxial with the central axis 114 of the mounting aperture 110, extending through the fender support 82. As shown in FIGS. 2 and 3, the axes 138 of the coupling apertures 134 also lie in the plane 116. As a result, the dual coupling portions on each fender support 82 are aligned with each other and are symmetrical about the plane 116.

In the illustrated construction, the walls 106a, 106b of each mounting portion 94 define an included angle $\alpha$ of about 58 degrees, and the walls 130a, 130b of each coupling portion 98 define an included angle $\beta$ of about 50 degrees to facilitate wedging of the mounting portions 94 against the coupling portions 98, discussed in more detail below. Alternatively, any of a number of different combinations of included angles of the walls 106a, 106b and included angles of the walls 130a, 130b may be utilized to facilitate wedging of the mounting portions 94 against the coupling portions 98.

With reference to FIG. 2, the fender struts 62 may be pre-assembled onto the rear fender 58 before the fender struts 62 are coupled (e.g., in a cantilevered fashion) to the frame 18. Specifically, the fender supports 82 may be positioned within the fender support covers 86, and the fasteners 89 may be inserted through the corresponding apertures 91, 88 in the fender support covers 86 and the fender supports 82, respectively. The sub-assembled fender struts 62 may then be fastened to the rear fender 58 in a conventional manner.

With continued reference to FIG. 2, the fender support covers 86 each include respective apertures 142 coaxially aligned with the apertures 134 in the coupling portions 98 of the fender support 82 and the apertures 110 in the mounting portions 94 of the rear frame member 66.

Figure 7A:
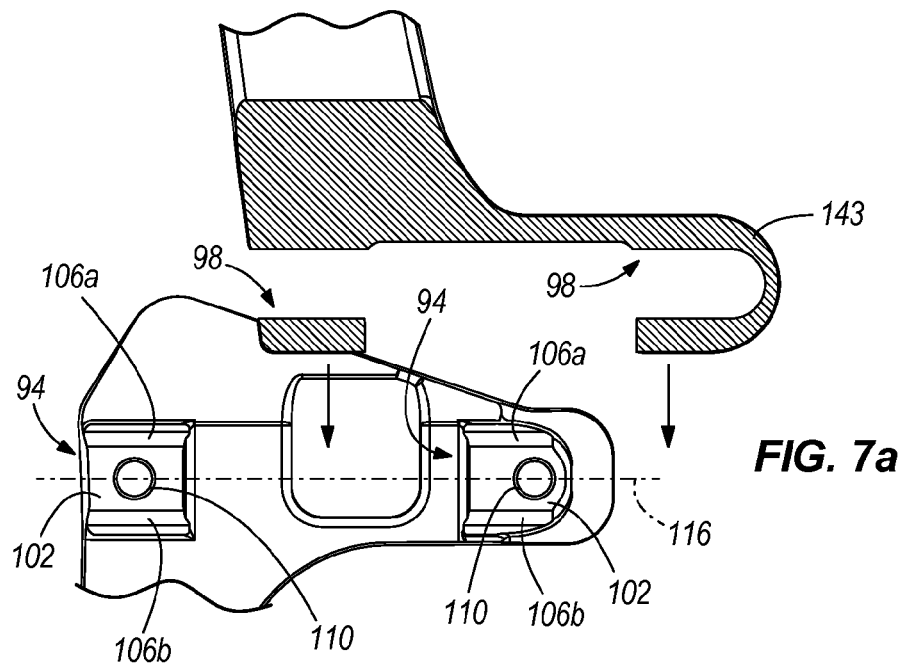
FIGS. 7a-7c are schematic views of the mounting and coupling portions illustrating the assembly of the coupling portion to the mounting portion.
Figure 7B:
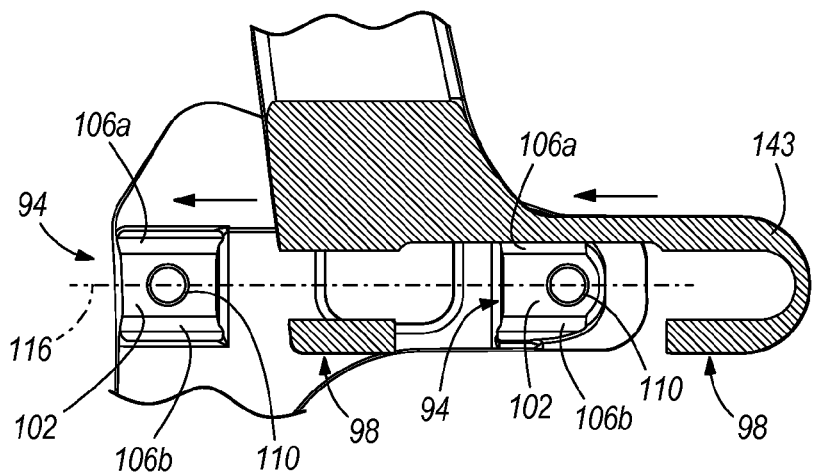
Figure 7C:
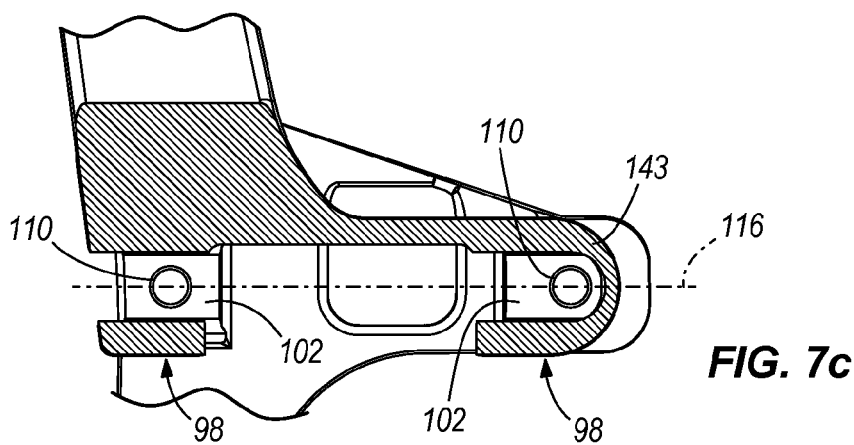

As shown in FIGS. 7a-7c, to couple the pre-assembled fender struts 62 and rear fender 58 to the rear frame members 66, the coupling portions 98 of the fender supports 82 are initially positioned above the mounting portions 94 of the rear frame members 66 such that the rearward coupling portion 98 is positioned above and between the two mounting portions 94. With additional reference to FIG. 3, the axes 114 of the mounting apertures 110 define an assembly plane 116, which is inclined (from front to back) at an angle of approximately 20 to 30 degrees relative to a horizontal support surface. After the coupling portions 98 are properly positioned above the mounting portions 94 (FIG. 7a), the coupling portions 98 are moved in a direction toward the assembly plane 116 until the coupling portions 98 are generally aligned with the mounting portions 94 as shown in FIG. 7b and the rearward coupling portion 98 is directly positioned between the mounting portions 94. The pre-assembled fender struts 62 and rear fender 58 may then be moved rearwardly and downwardly along the plane 116 as shown in FIGS. 7b and 7c until the respective apertures 142, 134 in the fender support covers 86 and the fender supports 82 coincide or align with the mounting apertures 110. In the illustrated construction of the fender struts 62, the forward-most coupling portion 98 on each fender support 82 includes an abutment surface 143 configured to engage a corresponding abutment surface 144 on the forward-most mounting portion 94 on each rear frame member 66 upon substantial alignment of the respective apertures 142, 134 in the fender support covers 86 and the fender supports 82 and the mounting apertures 110.

In this manner, the engagement of the mounting portions 94 on the rear frame member 66 and the coupling portions 98 on the frame supports 82 supports the fender struts 62 and rear fender 58 on the rear frame member 66 in preparation for being secured to the rear frame member 66. With reference to FIGS. 2 and 4a, a fastener 146 (e.g., a threaded bolt and washer) is inserted through each pair of aligned apertures 142, 134, and then inserted into the counter-bore 122 of the corresponding aligned mounting aperture 110. The fasteners 146 may be hand-tightened into the threaded bores 118 of the respective mounting apertures 110, causing the walls 106a, 106b of each mounting portion 94 to engage or wedge against the respective walls 130a, 130b of a mating coupling portion 98.

With reference to FIGS. 4 and 4a, the fasteners 146 may be further tightened using conventional hand tools (e.g., wrenches or ratcheting sockets), causing the walls 130a, 130b of each coupling portion 98 to deflect outwardly to allow the coupling surface 126 to engage the mounting surface 102 of a corresponding mounting portion 94 to increase the dimensional stability of each of the joints. The thickness "T" of each of the fender supports 82 at a location adjacent each of the coupling portions 98 should be proportional to the overall width "W" of each of the fender supports 82 so that the coupling walls 130a, 130b may be allowed to deflect outwardly at a desired torque setting of the fasteners 146 to allow the coupling surface 126 to engage the mounting surface 102. In the illustrated construction of the fender supports 82, the proportion of the overall width W of each of the fender supports 82 to the thickness T of each of the fender supports 82 is about 2:1.

The joints formed by interlocking or wedging the mounting portions 94 against the coupling portions 98 allow bending or shear loads applied to the fender 58 or the fender supports 82 to be directly transferred to the rear frame members 66 and the rest of the frame 18, rather than passing through the fasteners 146 themselves. As a result, the fasteners 146 are almost exclusively maintained in axial tension, irrespective of bending or shear loads that are applied to the fender 58.

The joints formed by interlocking or wedging the mounting portions 94 against the coupling portions 98 also allow larger loads to be applied to the fender 58 (e.g., allowing heavier saddle bags) without increasing the clamping force between the fender supports 82 and the rear frame members 66. In addition, the joints formed by interlocking or wedging the mounting portions 94 against the coupling portions 98 allow the fender supports 82 to transfer bending or shear loads applied to the fender 58 directly to the rear frame members 66 with little clamping force between the fender supports 82 and rear frame members 66. Further, the joints formed by interlocking or wedging the mounting portions 94 against the coupling portions 98 accommodate variations in size of the mounting portions 94 and coupling portions 98 that may be caused by variations in the thickness of paint applied to either the fender supports 82 or the rear frame members 66.

Figure 5:
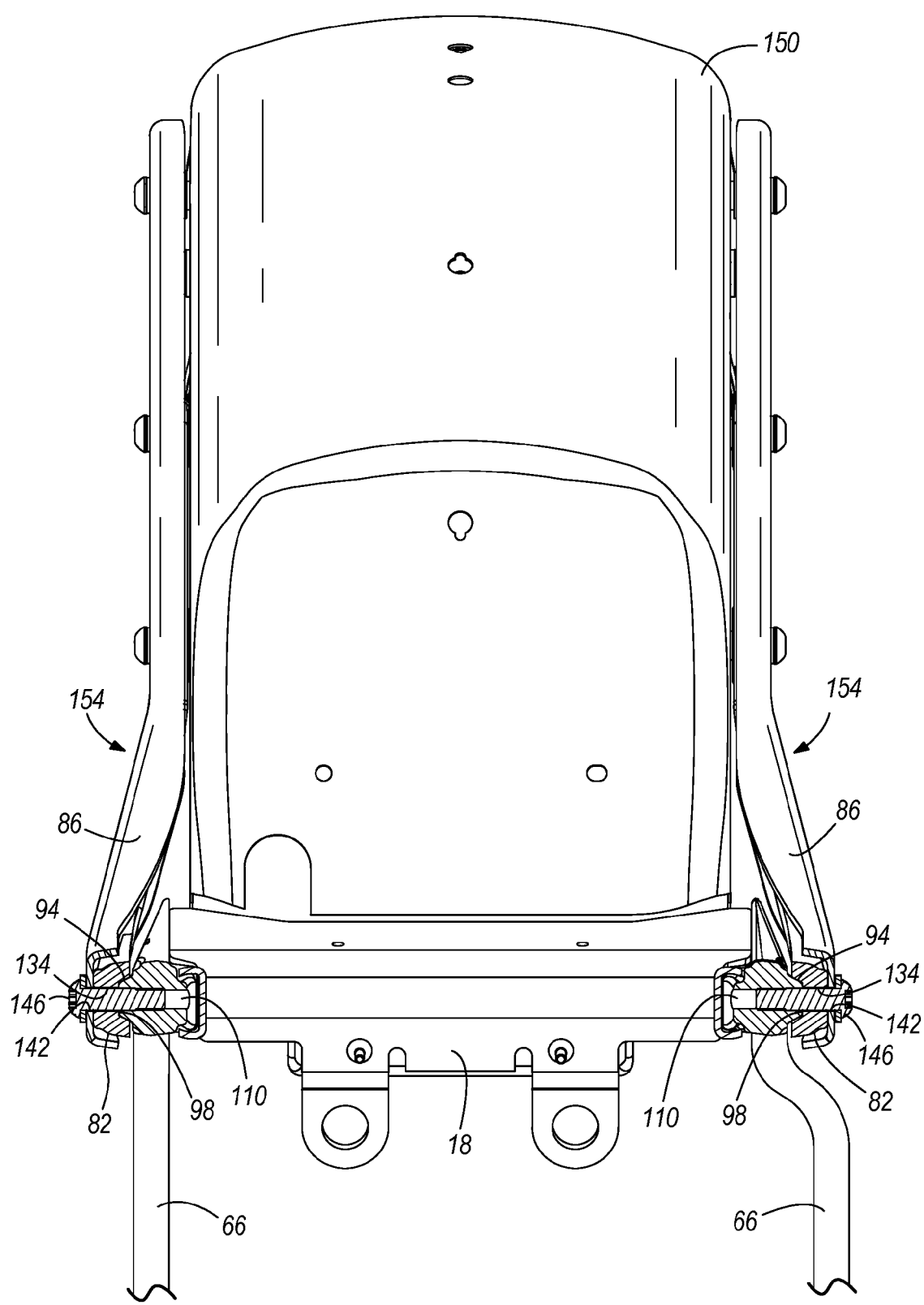
FIG. 5 is a cutaway view of the motorcycle frame of FIG. 2 incorporating a different size rear fender and an alternative configuration of fender struts coupling the different size rear fender to the frame.

The joints formed by interlocking or wedging the mounting portions 94 of the rear frame members 66 against the coupling portions 98 of the fender supports 82 also allow different size rear fenders, requiring differently-configured fender supports and fender support covers, to be coupled to the same frame 18. With reference to FIG. 5, a different size rear fender 150 is shown coupled to the rear frame members 66 via another pair of fender struts 62 having the same coupling portions 98 as those shown in FIGS. 2 and 4. Mounting the fender 150 to the rear frame members 66 via the fender struts 154 involves substantially the same process as that described above for the fender struts 62 of FIGS. 1-4, and will not be discussed again in detail. Therefore, manufacturers may utilize the same frame 18 in assembling motorcycles having standard-size rear tires and accompanying rear fenders 58, and in assembling motorcycles having wider rear tires and accompanying wider rear fenders 150. Consumers purchasing the motorcycle having the standard-size rear tire and rear fender 58 can also easily replace the standard-size tire and rear fender 58 with a wider tire and accompanying rear fender 150, without having to modify the frame 18 in any way to accommodate the wider rear tire and accompanying rear fender 150.

Figure 6:
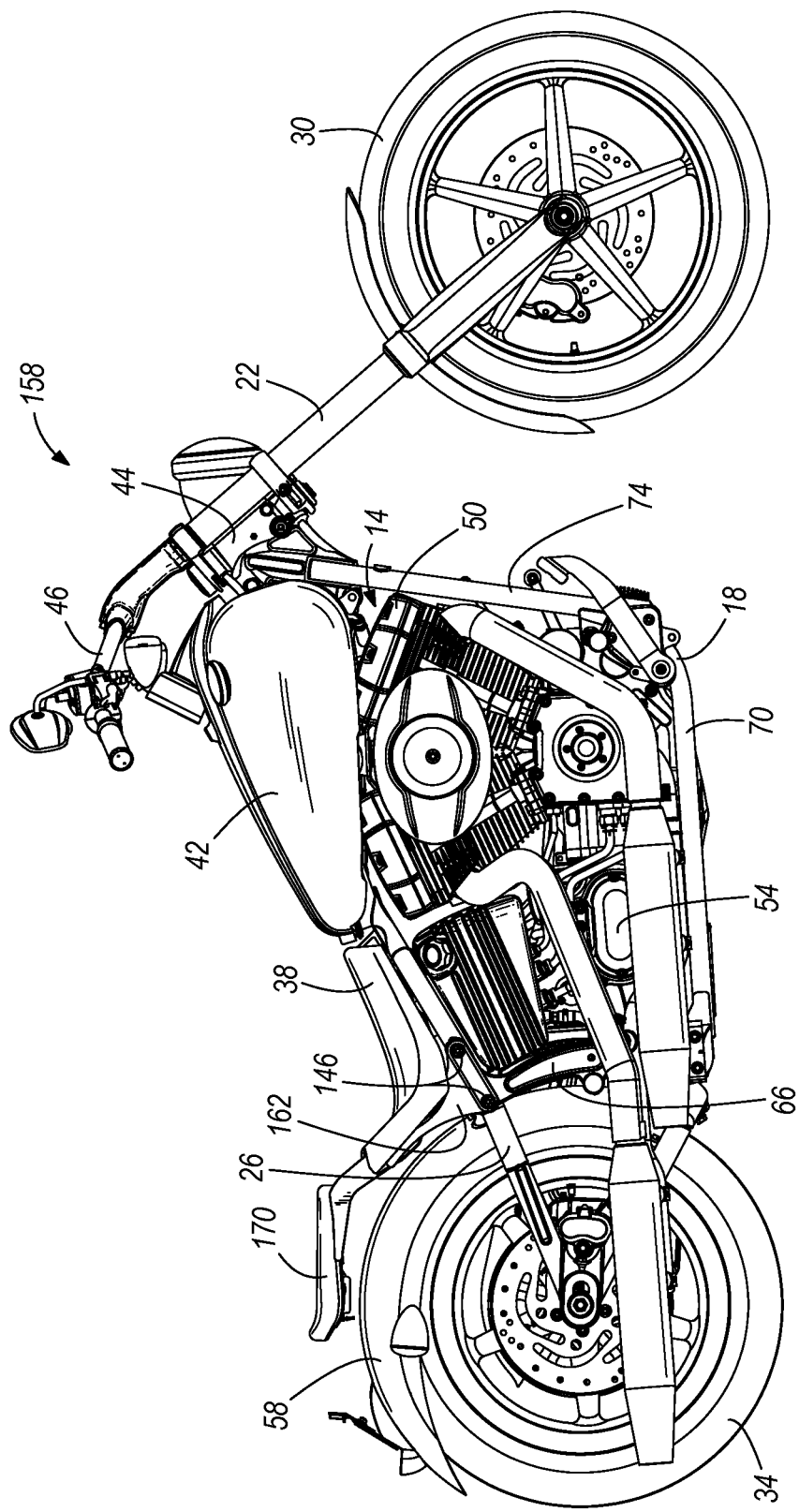
FIG. 6 is a side view of a motorcycle of the present invention incorporating another construction of a detachable support.

With reference to FIG. 6, an alternative construction of a motorcycle 158 includes support members 162 configured to couple a passenger seat 170 to the rear frame members 66. Like components are labeled with like reference numerals. Each seat support 162 includes coupling portions substantially similar to the coupling portions 98 of the fender supports 82 shown in FIGS. 2, 4, 4a, and 5. In yet other constructions, the motorcycle 158 may include detachable supports configured to couple a passenger back rest, a luggage rack, or one or more saddle bags to the rear frame members 66 without also supporting the motorcycle fender 58.

Various features of the invention are set forth in the following claims.

What is claimed is:

1. A motorcycle comprising:
a steering head;
a steering assembly pivotably coupled to the steering head;
at least one longitudinal frame member extending rearwardly from the steering head;
a rear frame member coupled to the longitudinal frame member, the rear frame member including a mounting portion having a mounting surface, and first and second walls extending from the mounting surface at an oblique angle to the mounting surface; and
a support coupled to the rear frame member, the support including a coupling portion having a coupling surface, and first and second walls extending from the coupling surface at an oblique angle to the coupling surface, the first and second walls of the mounting portion wedged against the first and second walls of the coupling portion, respectively, to substantially prevent rotation of the support with respect to the rear frame member.

2. The motorcycle of claim 1, wherein the mounting portion includes a mounting aperture extending through the mounting surface, wherein the coupling portion includes a coupling aperture defining an axis and extending through the coupling surface, and wherein the motorcycle further includes a fastener extending through the coupling aperture and into the mounting aperture to fasten the support to the rear frame member.

3. The motorcycle of claim 2, wherein the mounting aperture includes a threaded bore and the fastener includes a bolt, wherein the first and second walls of the mounting portion and the coupling portion carry substantially all lateral and torsional loads applied to the support relative to the axis, and wherein the bolt is therefore maintained substantially exclusively in axial tension.

4. The motorcycle of claim 2, further comprising a support cover at least partially overlying the support, wherein the support cover includes an aperture through which the fastener extends.

5. The motorcycle of claim 2, wherein the mounting aperture includes a threaded bore spaced axially inwardly from the mounting surface and a counter-bore extending between the threaded bore and the mounting surface.

6. The motorcycle of claim 1, wherein the mounting portion and the coupling portion each define a substantially trapezoidal cross-sectional shape.

7. The motorcycle of claim 1, wherein the coupling surface includes a pair of parallel edges, and wherein the first and second walls of the coupling portion extend from the parallel edges of the coupling surface.

8. The motorcycle of claim 1, wherein the mounting surface, the first and second walls of the mounting portion, the coupling surface, and the first and second walls of the coupling portion are each substantially planar.

9. The motorcycle of claim 1, wherein the mounting portion is a first mounting portion and the coupling portion is a first coupling portion, wherein the rear frame member further includes a second mounting portion having a mounting surface and first and second walls extending from the mounting surface of the second mounting portion at an oblique angle to the mounting surface of the second mounting portion, wherein the support further includes a second coupling portion having a coupling surface and first and second walls extending from the coupling surface of the second coupling portion at an oblique angle to the coupling surface of the second coupling portion, and wherein the first and second walls of the second mounting portion wedge against the first and second walls of the second coupling portion, respectively.

10. The motorcycle of claim 9, wherein each of the first and second mounting portions includes a mounting aperture extending through the respective mounting surfaces of the first and second mounting portions, wherein each of the first and second coupling portions includes a coupling aperture defining an axis and extending through the respective coupling surfaces of the first and second coupling portions, and wherein the respective axes of the coupling apertures in the first and second coupling portions are coplanar.

11. The motorcycle of claim 1, wherein the coupling surface and the first and second walls extending from the coupling surface comprise a recess, and wherein the mounting surface and the first and second walls extending from the mounting surface comprise a projection at least partially received within the recess.

12. The motorcycle of claim 1, wherein the coupling surface engages the mounting surface.

13. The motorcycle of claim 1, further comprising a swing arm pivotably coupled to the rear frame member.

14. The motorcycle of claim 1, further comprising a fender coupled to and supported by the support on the rear frame member.

15. The motorcycle of claim 1, further comprising a seat coupled to and supported by the support on the rear frame member.

16. The motorcycle of claim 1, wherein the first walls of the mounting portion and the coupling portion are substantially parallel, wherein the second walls of the mounting portion and the coupling portion are substantially parallel, and wherein the coupling portion is slidable relative to the mounting portion in a direction substantially parallel to the lengths of the first and second walls of the mounting portion and the first and second walls of the coupling portion.

17. A method of assembling a motorcycle, the method comprising:
providing a frame having a rear frame member;
providing a support member including a coupling portion having a coupling surface, and first and second walls extending from the coupling surface at an oblique angle to the coupling surface;
wedging the first and second walls of the coupling portion against a portion of the rear frame member; and
fastening the support member to the rear frame member.

18. The method of claim 17, further comprising coupling a fender to the support member.

19. The method of claim 18, further comprising selecting the support member from a group of different support members, each of which is configured to support a different size fender thereon.

20. The method of claim 17, further comprising coupling a passenger seat to the support member.

21. The method of claim 17, further comprising providing a mounting portion on the rear frame member, the mounting portion including a mounting surface, and first and second walls extending from the mounting surface at an oblique angle to the mounting surface, wherein wedging the first and second walls of the coupling portion includes wedging the first and second walls of the coupling portion against the first and second walls of the mounting portion, respectively.

22. The method of claim 17, wherein wedging the first and second walls includes sliding the first and second walls of the coupling portion relative to the portion of the rear frame member in a direction substantially parallel to the lengths of the first and second walls of the coupling portion.

* * * * *